United States Patent [19]
Bingener et al.

[11] Patent Number: 5,444,210
[45] Date of Patent: Aug. 22, 1995

[54] APPARATUS FOR FLYING-SHEAR CUTTING OF THIN-LAYER MATERIAL BY LASER RADIATION

[76] Inventors: F. Dieter Bingener, Dornseifer Str. 30, 57223 Kreuztal; Kai-Uwe Preissig, Moreller Weg 62, 52074 Aachen; Arnold Gillner, An der Hohe 33, 5276 Aachen, all of Germany; Dirk Petring, Feldbiss 125, NL-6462 HE Kerkrade, Netherlands

[21] Appl. No.: 141,062

[22] Filed: Oct. 26, 1993

[30] Foreign Application Priority Data

Oct. 26, 1992 [DE] Germany ............... 42 35 863.9

[51] Int. Cl.$^6$ .................. B23K 26/00; B23K 26/02
[52] U.S. Cl. ................. 219/121.67; 219/121.72; 219/121.85; 219/121.76; 219/121.77
[58] Field of Search .......... 219/212.67, 121.69, 219/121.72, 121.76, 121.77, 121.85, 121.63

[56] References Cited

U.S. PATENT DOCUMENTS

| | | | |
|---|---|---|---|
| 4,012,027 | 3/1977 | Hooper | 266/58 |
| 4,659,900 | 4/1987 | Gilli et al. | 219/121 LG |
| 4,782,208 | 11/1988 | Withrow et al. | 219/121.72 |
| 4,972,062 | 11/1990 | Aharon | 219/121.78 |

FOREIGN PATENT DOCUMENTS

| | | |
|---|---|---|
| 0516199 | 12/1992 | European Pat. Off. |
| 2458656 | 6/1976 | Germany |
| 2514027 | 2/1977 | Germany |
| 62-238090 | 10/1987 | Japan |

Primary Examiner—Mark H. Paschall
Attorney, Agent, or Firm—Young & Thompson

[57] ABSTRACT

The disclosure involves an apparatus (1) for the flying-shear cutting of thin-layer material, reeled off from a coil, by laser radiation, especially metal strips, fabrics, synthetic resins, paper, cardboard, and composite materials. In order to be able to crosscut individual strip sections (17) at high speeds without having to arrest the strip (2), the apparatus (1) consists of a traverse (3) arranged at an angle to the travel direction (a) of the strip (2), this traverse being rotatably supported and driven about its longitudinal axis of symmetry (4). Mutually opposed guides (5) for two separately operable laser cutting heads (6) with nozzles (7) are mounted in parallel to the longitudinal axis of symmetry (4) of the traverse (3). The laser cutting heads (6) are in each case movable separately or individually by way of the guides (5). The nozzles (7) of the two laser cutting heads (6) are arranged to face away from each other and project through longitudinally extending slots (8) in an outer housing (9) of the traverse (3).

9 Claims, 3 Drawing Sheets

APPARATUS FOR FLYING-SHEAR CUTTING OF THIN-LAYER MATERIAL BY LASER RADIATION

The invention relates to an apparatus for the flying-shear cutting of thin-layer material, reeled off from a coil, by laser radiation, especially metal strips, fabrics, synthetic resins, paper, cardboard, and composite materials.

In general, mechanical curing devices are utilized for the cross-cutting of strips. These shears, however, exhibit the drawback that the strip must be arrested during the actual cutting step. Thereby, the idle times of the shears become long which then has a negative effect on the costs of a respectively cut strip section.

However, there are also facilities for the cutting of sheet metal wherein "flying shears" are employed permitting a cross-cutting of strip-shaped material without having to arrest the strip material. In such flying shears, though, relatively large masses must be accelerated and decelerated so that high strip speeds are hardly possible.

Successful attempts for the longitudinal cutting of thin-gage sheet metal by means of a laser beam have, however, also been undertaken wherein very high cutting speeds have been attained.

SUMMARY OF THE INVENTION

The invention is based on the object of fashioning an apparatus of the type discussed hereinabove so that, during the cross-cutting of the strip sections, a very high cutting accuracy and, above all, a high quality of the cutting edges of any desired contour are achieved, at a high cutting speed, without having to stop the facility or the strip, and without having to move large masses.

This object has been attained according to this invention by the features of the characterizing portion of claim 1.

Suitable further developments of the invention can be derived from the dependent claims.

In the apparatus of this invention, an accurate, program-controlled cross-cutting (cutting to length) of lengths of material is made possible without having to stop the facility for cutting the sections; in this connection, the speeds can also be very high since there is no need, either, for moving large masses in the zone of the traverse for the displacement of the laser cutting heads. The speeds, though, are also dependent on the angle of the traverse which latter is arranged obliquely to the travel direction of the strip and/or of the length of material.

By virtue of the program control, any desired cutting contours are possible in the longitudinal and transverse directions. The laser radiation ensures cutting edges which have a low number of burrs up to even no burrs at all. No mechanical force application whatever occurs at the cutting edges, and there are only extremely minor deformations and, respectively, alterations of the crystalline structure in the cutting edge zone. Furthermore, no tool changes are required, such as, for example, the changing of blades in case of mechanical shears. On account of the program-controlled and automatic setting of the laser cutting heads, the set-up times are reduced to a minimum.

One embodiment of the invention is indicated in the drawings in a schematically simplified view. In the drawings:

DETAILED DESCRIPTION OF DRAWINGS

An apparatus 1 for the flying-shear cutting of thin-layer material reeled off from a coil is arranged at a transverse and longitudinal cutting facility. The separation of the material, such as, for example, metal strips, fabric, synthetic resins, paper, cardboard, and composite materials, is effected by laser radiation.

Figure 1:
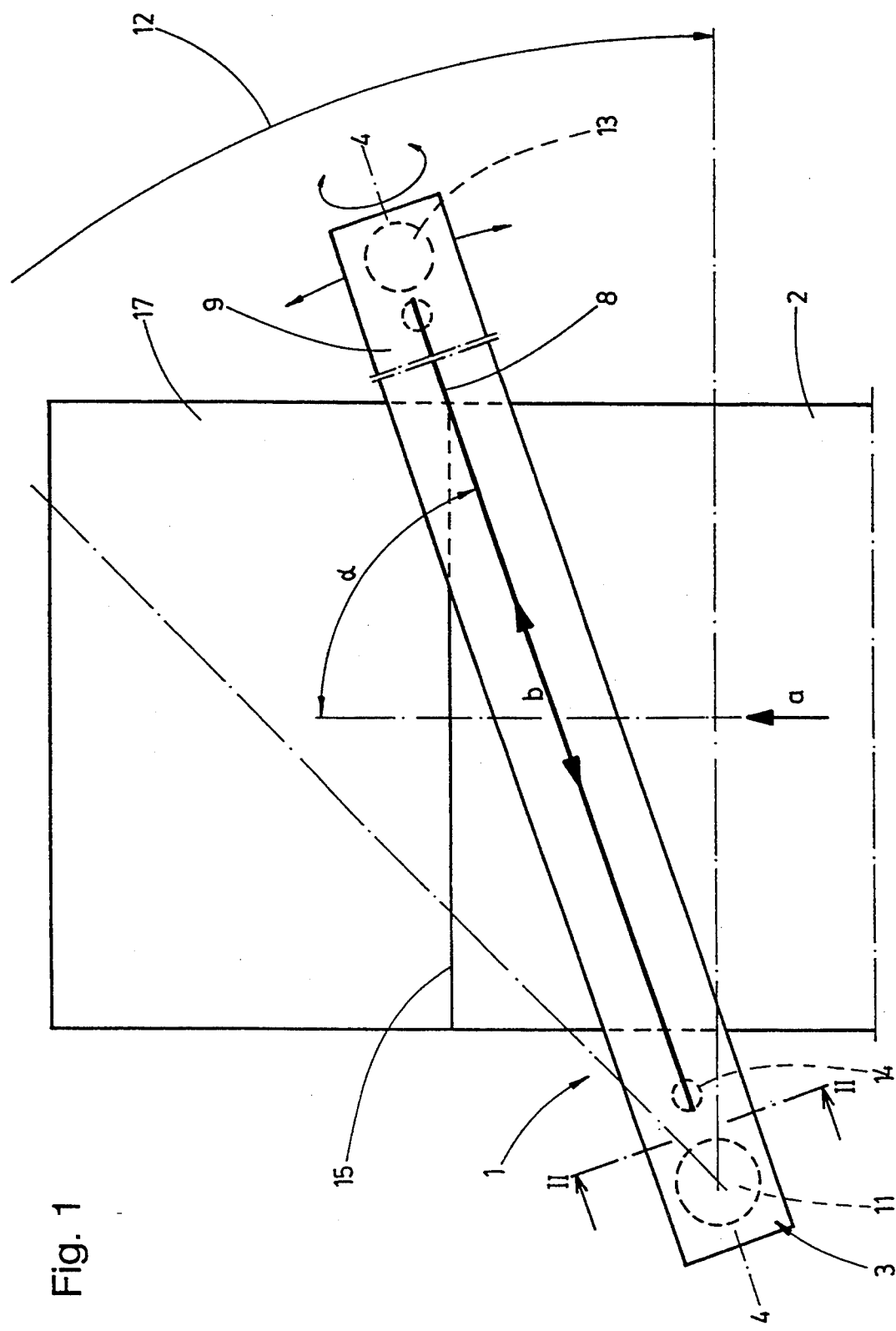
FIG. 1 shows a top view of the apparatus.
Figure 2:
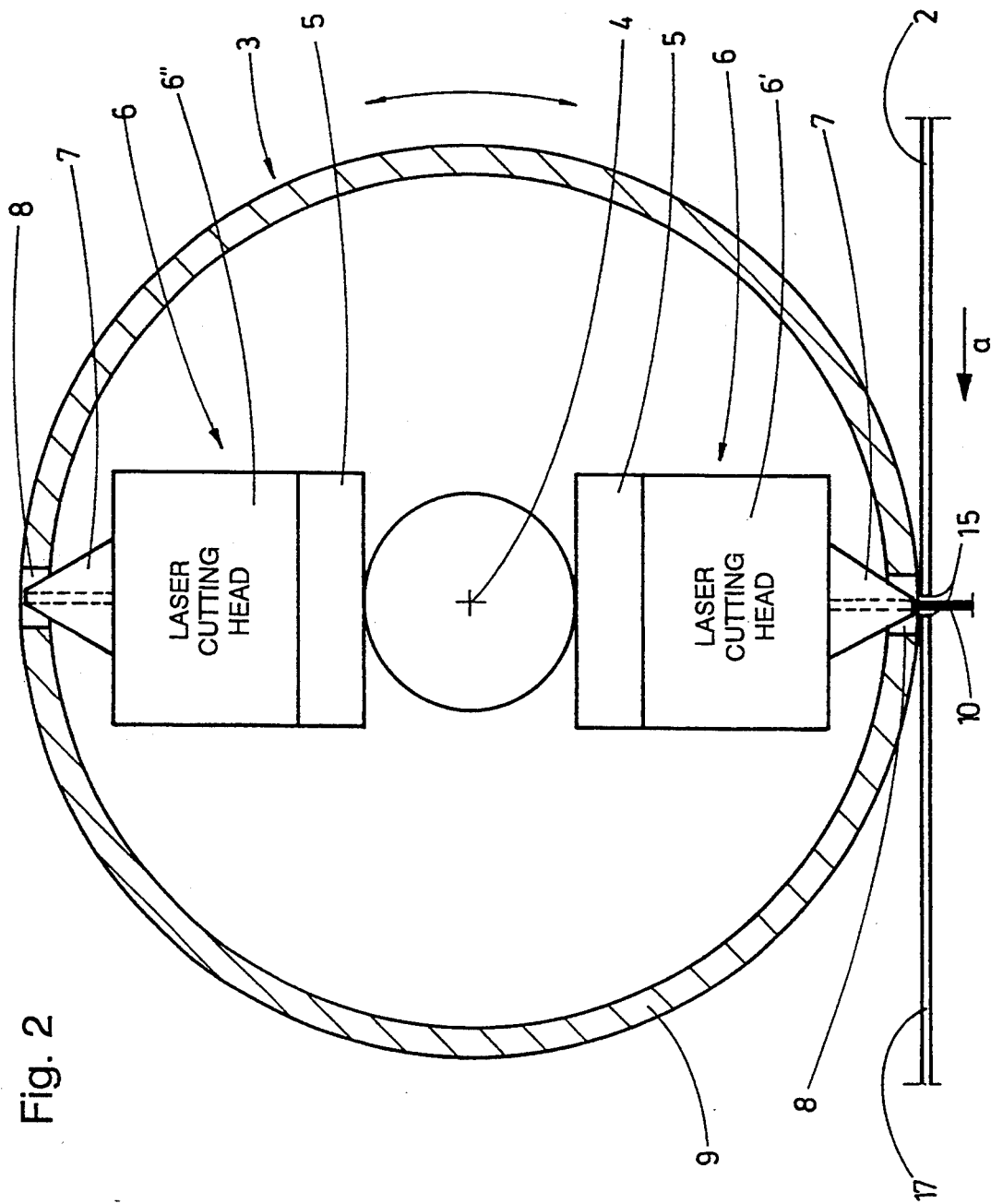
FIG. 2 shows a section along line II—II in FIG. 1 in the operating position.

The apparatus 1 consists, as shown in FIGS. 1 and 2, of a traverse 3 arranged at an angle to the travel direction a of the strip 2, this traverse being supported to be pivotable and being driven about its longitudinal axis of symmetry 4. Mutually oppositely arranged guide means 5 for two separately operable laser cutting heads 6 with nozzles 7 are mounted in parallel to the longitudinal axis of symmetry 4 of the traverse 3. The laser cutting heads 6 are movable by way of the guide means 5 in each case separately or individually in the forward or backward direction, the nozzles 7 of the two laser cutting heads 6 being arranged to face away from each other, i.e. offset by 180°. The laser cutting heads 6 extend herein with their nozzles 7 through slots 8 extending in the longitudinal direction b in an outer housing 9 of the traverse 3 so that the laser beam 10 can be guided sufficiently closely toward the cutting material and/or the strip 2.

In the traverse 3 of the apparatus 1, it is also possible to provide more than two separately operable laser cutting heads 6 with nozzles 7 at equal angular spacings about the longitudinal axis of symmetry 4 of the traverse 3 (this is not illustrated). The angular spacings are, for example with three laser cutting heads 6, 120° and, with four laser cutting heads 6, 90°. This arrangement makes it possible to further increase the speed since less time is necessary for a rotation of 120° or even 90° than for a rotation of 180°. The laser cutting heads 6 can be moved also in this embodiment by way of the guide means 5 in each case separately or individually in the forward and backward directions, and the nozzles 7 of the laser cutting heads 6 likewise project through correspondingly arranged slots 8 extending in the longitudinal direction b in the outer housing 9 of the traverse 1.

It is also possible to provide, on each guide means 5, several laser cutting heads 6 with nozzles 7 which can be moved in the longitudinal direction b of the traverse 3 in each case separately or individually in the forward and backward directions (not illustrated).

The apparatus 1 exhibits on one side a stand 11 on which the traverse 3 is pivotably supported for adjusting the angle α between the traverse 3 and the travel direction a of the strip 2. The adjusting range 12 of the angle α is suitably between 90° and 45° with respect to the travel direction a of the strip. Choosing a larger angle α is not suitable since the route to be traveled by the respective laser cutting head 6 would thereby become too long and accordingly the operating speed would again be reduced. The angle α to be selected in each case is to be adapted to the requirements during the cutting operation, i.e. the angle is dependent on the size (length L×width B) of the cutting material and on the set feeding speed of the strip 2.

The apparatus 1 can exhibit an additional support 13 for the traverse 3 on the side of the strip 2 lying in opposition to the stand 11; this support is adjustably mounted with the traverse 3. In case of a fixedly set angle α, the support 13 is fixedly mounted.

Figure 3:
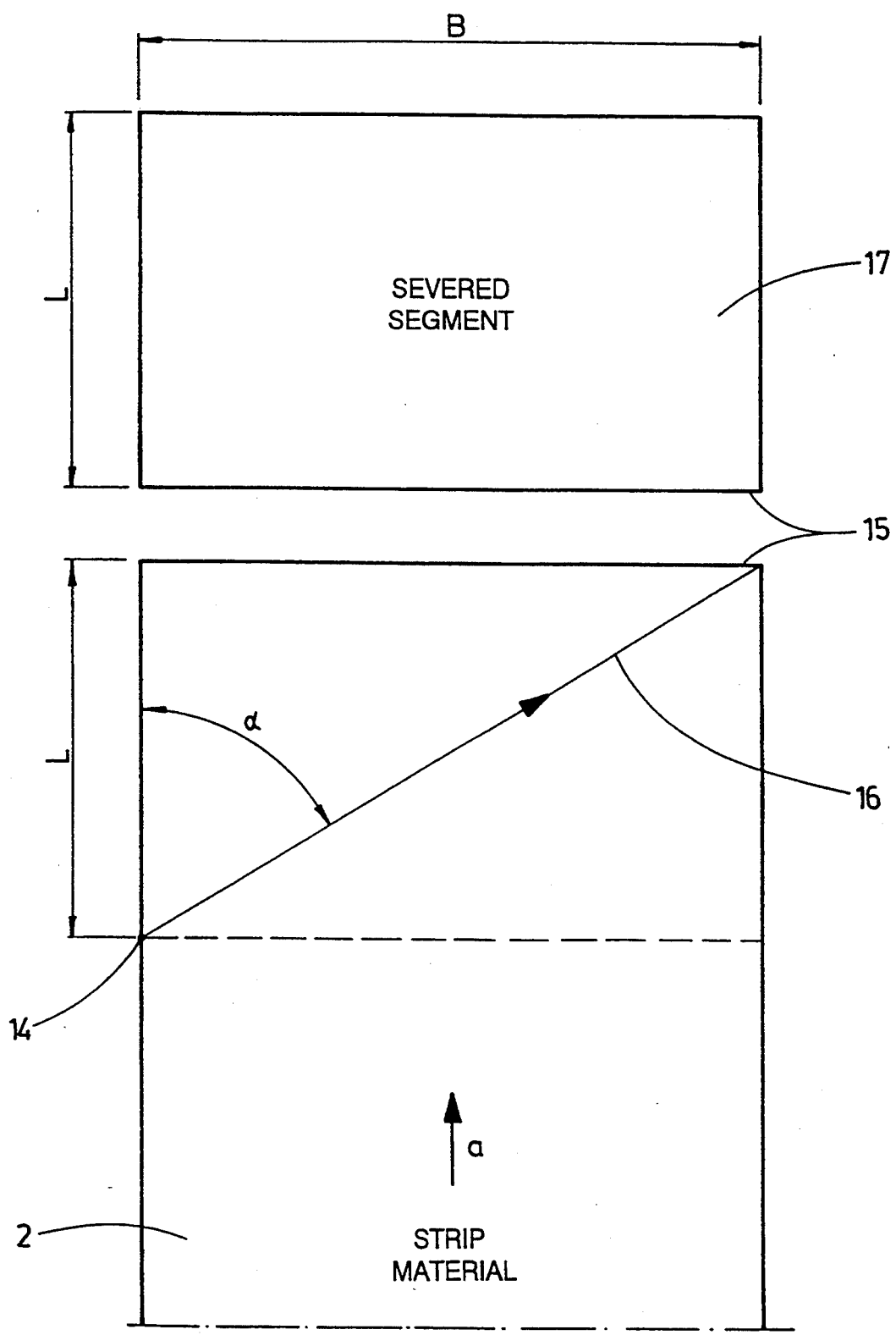
FIG. 3 shows a flow chart of the embodiment.

FIG. 3 illustrates a flow chart for the embodiment. In this scheme, during the cutting step, the lower laser cutting head 6' travels directly above the cutting material or the strip 2 and severs same. At the same time, the upper laser cutting head 6" is moved into the starting position 14. After termination of the cutting step, the laser beam 10 is decoupled from the lower laser cutting head 6", the gas supply is switched over, and the traverse 3 revolves so that the upper laser cutting head 6" enters the operative position. Subsequently, a new cutting operation can be started immediately.

The position of the cutting edge 15 is a resultant 16 from the motions of the cutting material or strip 2 and the laser cutting head 6 which is in the operative position. In this arrangement, one of the axes, i.e. the strip route or the laser route, takes over the master function in which the velocity is variably selective, and the other takes over the slave function which is automatically adapted to the master function and must follow the latter. As a supplementary feature, the angle α of the traverse 3 can be altered.

By changing and/or adaptation of the parameters of feeding speed of the cutting material or strip 2, feeding speed of the laser cutting head 6, and angle α of the traverse with respect to the cutting material or strip 2, the section length and contour of one or several strip segments 17 can be determined.

For the longitudinal cutting of the strips 2, a cutting frame (not shown) can be arranged in the travel direction a of the strip 2 upstream of the apparatus 1 wherein a number of laser cutting heads 6 corresponding to the number of cuts is provided in the cutting frame. In this way, any desired strip width and contour can be produced by programmable servo drive mechanisms of the laser cutting heads 6.

What is claimed is:

1. Apparatus for the flying-shear cutting of thin-layer material, reeled off from a coil, by means of laser radiation, especially metal strips, fabrics, synthetic resins, paper, cardboard, and composite materials, comprising a traverse (3) arranged at an angle to the travel direction (a) of the strip (2), this traverse being supported and driven to be rotatable about its longitudinal axis of symmetry (4), wherein separate guide means (5) for a plurality of separately operable laser cutting heads (6) with nozzles (7) are mounted in parallel to a longitudinal axis of symmetry (4) of the traverse (3), these laser cutting heads being arranged at the periphery of the guide means (5), wherein the laser cutting heads (6) are in each case movable separately and/or individually by way of the guide means (5), the nozzles (7) of the two laser cutting heads (6) being arranged to face radially outwardly of said axis in different directions and projecting through longitudinally extending slots (8) in an outer housing (9) of the traverse (3).

2. Apparatus according to claim 1, there being more than two separately drivable laser cutting heads (6) with nozzles (7), arranged at equal angular spacings about the longitudinal axis of symmetry (4) of the traverse (3), wherein the laser cutting heads (6) are in each case movable separately and/or individually by way of the guide means (5), and the nozzles (7) of the laser cutting heads (6) project through correspondingly arranged slots (8) in the outer housing (9) of the traverse (3).

3. Apparatus according to claim 1, there being several laser cutting heads (6) with nozzles (7) arranged on each guide means (5).

4. Apparatus according to claim 1, wherein the apparatus (1) exhibits on one side a stand (11) on which the traverse (3) is pivotably supported for adjusting the angle (α) between the traverse (3) and the travel direction (a) of the strip (2).

5. Apparatus according to claim 4, wherein the adjustment range (12) of the angle (a) lies between 90 degrees and 45 degrees.

6. Apparatus according to claim 1, wherein an additional support (13) is provided for the traverse (3) on the side of the strip (2) lying in opposition to the stand (11).

7. Apparatus according to claim 6, wherein the support (13) with the traverse (3) is mounted to be adjustable.

8. Apparatus according to claim 1, located downstream of a cutting frame for longitudinal cutting, this frame exhibiting a number of laser cutting heads (6) corresponding to the number of cuts.

9. Apparatus according to claim 1, there being two said laser heads (6) facing oppositely away from each other.

* * * * *